(12) United States Patent  
Yoshizawa et al.

(10) Patent No.: US 7,876,366 B2
(45) Date of Patent: Jan. 25, 2011

(54) ELECTRONIC CAMERA (75) Inventors: Kazutaka Yoshizawa, Daito (JP); Kohei Fukukawa, Higashiosaka (JP); Kazuhiro Tsujino, Matsubara (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 525 days.

(21) Appl. No.: 11/500,428

(22) Filed: Aug. 8, 2006

(65) Prior Publication Data

US 2007/0035778 A1 Feb. 15, 2007

(30) Foreign Application Priority Data

Aug. 9, 2005 (JP) ............... 2005-230190

(51) Int. Cl.
H04N 5/235 (2006.01)
H04N 5/228 (2006.01)
H04N 5/238 (2006.01)

(52) U.S. Cl. .............. 348/229.1; 348/208.99; 348/222.1; 348/208.12; 348/362; 348/363; 348/364; 348/365

(58) Field of Classification Search ........ 348/222.1, 348/362, 241, 300, 297, 208.99, 220.1; 358/504, 358/302

See application file for complete search history.

(56) References Cited

U.S. PATENT DOCUMENTS

| | | | | |
|---|---|---|---|---|
| 4,673,277 | A * | 6/1987 | Someya et al. ........ | 396/291 |
| 5,774,746 | A * | 6/1998 | Kirigaya et al. ....... | 396/49 |
| 6,720,995 | B1 * | 4/2004 | Kaneda et al. ........ | 348/208.8 |
| 6,924,837 | B2 * | 8/2005 | Wakui ................ | 348/208.99 |
| 7,184,078 | B2 * | 2/2007 | Okisu et al. .......... | 348/222.1 |
| 7,221,394 | B2 * | 5/2007 | Enomoto ............. | 348/229.1 |
| 7,379,094 | B2 * | 5/2008 | Yoshida et al. ........ | 348/208.99 |
| 7,567,286 | B2 * | 7/2009 | Takei et al. .......... | 348/335 |
| 2001/0043279 | A1 * | 11/2001 | Niikawa et al. ....... | 348/335 |

(Continued)

FOREIGN PATENT DOCUMENTS

JP 6-301078 A 10/1994

(Continued)

OTHER PUBLICATIONS

Japanese Office Action Jun. 29, 2010, issued in corresponding Japanese Patent Application No. 2005-230190.

*Primary Examiner*—Jason Chan
*Assistant Examiner*—Michael Osinski
(74) *Attorney, Agent, or Firm*—Westerman, Hattori, Daniels & Adrian, LLP (57) ABSTRACT

An electronic camera includes an imaging device. The imaging device carries out an exposing operation for exposing an object scene and an amplifying operation for amplifying a raw image signal generated by the exposing operation, according to a set imaging parameter. A CPU selects one program chart satisfying a parameter condition, from a plurality of program charts stored in a flash memory, and extracts three imaging parameters from the selected program chart. The extracted imaging parameters are set to the imaging device. The imaging parameter here includes exposure time, amount of aperture, and AGC gain as parameter elements. In addition, the parameter condition includes an AGC gain condition in that each of three AGC gains defining respectively the three imaging parameters is equal to or less than a predetermined value and an exposure time condition in that three exposure times defining respectively the three imaging parameters are shorter.

8 Claims, 5 Drawing Sheets

U.S. PATENT DOCUMENTS

| | | | |
|---|---|---|---|
| 2003/0007076 A1* | 1/2003 | Okisu et al. | 348/222.1 |
| 2003/0197792 A1* | 10/2003 | Kikuchi | 348/220.1 |
| 2003/0214600 A1* | 11/2003 | Kido | 348/362 |
| 2004/0036781 A1* | 2/2004 | Enomoto | 348/231.99 |
| 2004/0189837 A1* | 9/2004 | Kido | 348/241 |
| 2004/0218246 A1* | 11/2004 | Onuki et al. | 359/234 |
| 2005/0062875 A1* | 3/2005 | Ojima | 348/362 |
| 2005/0200744 A1* | 9/2005 | Kobayashi | 348/362 |
| 2006/0197866 A1* | 9/2006 | Fujimoto | 348/362 |

FOREIGN PATENT DOCUMENTS

| | | |
|---|---|---|
| JP | 11-150679 A | 6/1999 |
| JP | 2005-130213 A | 5/2005 |

* cited by examiner

ELECTRONIC CAMERA

CROSS REFERENCE OF RELATED APPLICATION

The disclosure of Japanese Patent Application No. 2005-230190 is incorporated herein by reference.

BACKGROUND OF THE INVENTION

1. Field of the Invention

The present invention relates to an electronic camera. More specifically, the present invention relates to an electronic camera that is used for a digital camera to carry out a plurality of imaging operations using a plurality of different imaging parameters.

2. Description of the Related Art

One example of this kind of conventional apparatus is disclosed in patent document 1 (Japanese Patent Application Laying-open No. 2005-130213). According to the related art, bracket photography is carried out according to a plurality of parameters (shutter speed and f number) decided in conformity with a predetermined program chart. In bracket photography, however, a plurality of different parameters are employed for a plurality of photographing operations. This may not implement successful bracket photography with some program charts.

SUMMARY OF THE INVENTION

Therefore, it is a primary object of the present invention to provide a novel electronic camera.

It is another object of the present invention to provide an electronic camera that implements successful bracket photography.

According to the present invention, an electronic camera (10: reference numeral corresponding to one used in a description of the embodiments. The same applies to following reference numerals.) comprises: an imager (25) for carrying out an exposing operation for exposing an object scene and an amplifying operation for amplifying an image signal generated by the exposing operation, according to a set imaging parameter; a holder (50) for holding a plurality of program charts each of which is represented by M (M: 3 or a larger integer) imaging parameters; a selector (S19, S21, S23, S25, S27, S29) for selecting a single program chart which satisfies a parameter condition, from among the plurality of program charts held by the holder; an extractor (S31) for extracting N (N: 2 or an integer larger than 2 and smaller than M) imaging parameters from the program chart selected by the selector; and a setter (S43, S47, S51) for setting the N imaging parameters extracted by the extractor to the imager, wherein the imaging parameter includes an exposure time, an amount of aperture and an amplification factor as parameter elements, the parameter condition includes an amplification factor condition in that each of N amplification factors defining respectively the N imaging parameters is equal to or less than a predetermined value and an exposure time condition in that N exposure times defining respectively the N imaging parameters are shorter.

The imager carries out an exposing operation for exposing an object scene and an amplifying operation for amplifying an image signal generated by the exposing operation, according to a set imaging parameter. Each of the plurality of program charts held by the holder is represented by M (M: 3 or a larger integer) imaging parameters.

The selector selects a single program chart which satisfies a parameter condition, from the plurality of program charts held by the holder. The N (N: 2 or an integer larger than 2 and smaller than M) imaging parameters are extracted by the extractor from the program chart selected by the selector. The extracted N imaging parameters are set by the setter to the imager. The imaging parameter includes an exposure time, an amount of aperture and an amplification factor as parameter elements. The parameter condition includes an amplification factor condition in that each of N amplification factors defining respectively the N imaging parameters is equal to or less than a predetermined value and an exposure time condition in that N exposure times defining respectively the N imaging parameters are shorter.

By focusing attention on the program chart in which all of the N AGC gains defining respectively the N imaging parameters are equal to or less than the predetermined value, it is possible to reduce noise superimposed on the entire image signal. Additionally, by taking notice of the program chart in which the N exposure times defining respectively the N imaging parameters are shorter, it is possible to prevent image distortion resulting from hand shaking. This implements successful bracket photography.

Preferably, a parameter element coefficient with which an image based on an image signal output from the imager has proper luminance is detected by the detector (S15, S17). The selector selects a program chart corresponding to the parameter element coefficient detected by the detector. This allows appropriate selection of a program chart.

Preferably, the N imaging parameters include a proper imaging parameter with which an image based on an image signal output from the imager has proper luminance.

Preferably, the predetermined value is decided in consideration of amount of noise appearing on the image based on the amplified image signal. This avoids conspicuous noise from being superimposed on the image signal.

Preferably, the N image signals obtained by N exposing operations and N amplifying operations according to the N imaging parameters is subjected by a recording processor (S53) to a recording process. This makes it possible to save a plurality of images resulted from bracket photography.

Preferably, the plurality of program charts held by the holder correspond to a plurality of imaging modes, respectively.

According to the present invention, an imaging control program product to be executed by a processor (44) of the electronic camera (10) comprising the imager (25) for carrying out an exposing operation for exposing an object scene and an amplifying operation for amplifying an image signal generated by the exposing operation according to a set imaging parameter and the holder (50) for holding a plurality of program charts each of which is represented by M (M: 3 or a larger integer) imaging parameters, comprises: a selecting step (S19, S21, S23, S25, S27, S29) of selecting a single program chart which satisfies a parameter condition, from among the plurality of program charts held by the holder; an extracting step (S31) of extracting N (N: 2 or larger and less than M integer) imaging parameters from the program chart selected in the selecting step; and a setting step (S43, S47, S51) of setting the N imaging parameters extracted in the extracting step to the imager, wherein the imaging parameter includes an exposure time, an amount of aperture and an amplification factor as parameter elements, the parameter condition includes an amplification factor condition in that each of N amplification factors defining respectively the N imaging parameters is equal to or less than a predetermined value and an exposure time condition in that N exposure times defining respectively the N imaging parameters are shorter.

According to the present invention, an imaging control method to be practiced by an electronic camera (10) comprising an imager (25) for carrying out an exposing operation for exposing an object scene and an amplifying operation for amplifying an image signal generated by the exposing operation according to a set imaging parameter and a holder (50) for holding a plurality of program charts each of which is represented by M (M: 3 or a larger integer) imaging parameters, comprising the steps of: (a) selecting a single program chart which satisfies a parameter condition, from among the plurality of program charts held by the holder; (b) extracting N (N: 2 or an integer larger than 2 and less than M) imaging parameters from the program chart selected in the step (a); and (c) setting the N imaging parameters extracted in the step (b) to the imager, wherein the imaging parameter includes an exposure time, an amount of aperture and an amplification factor as parameter elements, the parameter condition includes an amplification factor condition in that each of N amplification factors defining respectively the N imaging parameters is equal to or less than a predetermined value and an exposure time condition in that N exposure times defining respectively the N imaging parameters are shorter.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
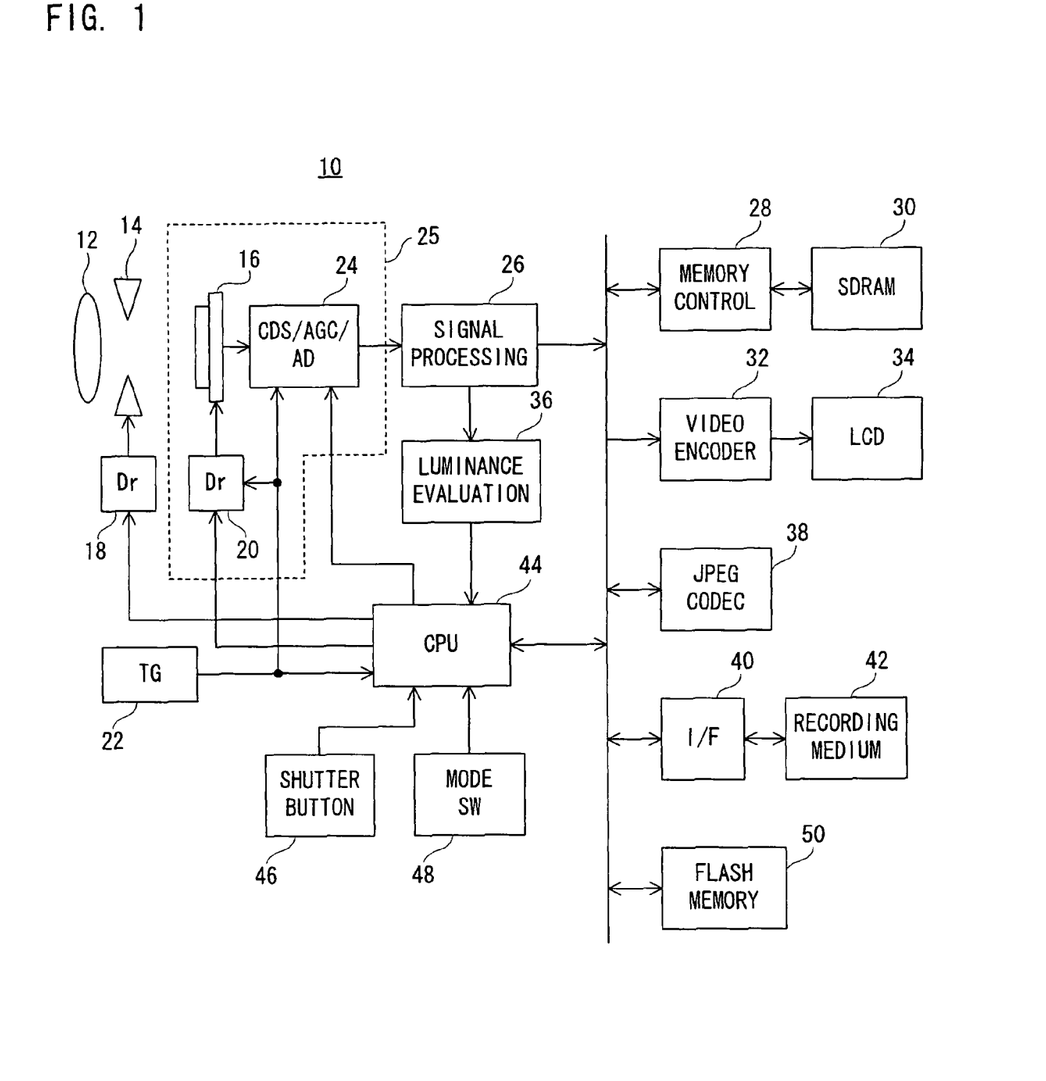
FIG. 1 is a block diagram showing a structure of one embodiment of the present invention.

Referring to FIG. 1, an electronic camera (digital camera) 10 of this embodiment includes an optical lens 12 and an aperture unit 14. An optical image of an object scene is irradiated through these structural members onto a light-receiving surface, i.e., an imaging surface of a CCD-type image sensor 16. On the imaging surface, an electronic charge corresponding to the optical image of the object scene, that is, a raw image signal is generated by photoelectric conversion. An imaging device 25 is formed by the image sensor 16, a driver 20 and a CDS/AGC/AD circuit 24 which are described later.

In carrying out a through image processing, that is, processing for display of a real-time moving image of the object scene on the LCD monitor 34, the CPU 44 instructs the driver 18 to widen the aperture, instructs the driver 20 to repeat pre-exposure and thinned-out reading, and instructs the CDS/AGC/AD circuit 24 to set an AGC gain (amplification factor) at "1.0". Accordingly, the driver 18 increases the amount of aperture of the aperture unit 14, the driver 20 repeatedly performs pre-exposure of the image sensor 16 and thinned-out reading of a resulting raw image signal. The pre-exposure and thinned-out reading are carried out in response to a vertical synchronization signal Vsync generated from the TG 22 at intervals of 1/30 second. Consequently, low-resolution raw image signals corresponding to the optical image of the object scene are output from the image sensor 16 at a frame rate of 30 fps.

The output raw image signal of each frame is subjected by the CDS/AGC/AD circuit 24 to a series of processes such as noise reduction, gain adjustment, and A/D conversion. The gain adjustment is carried out with reference to the AGC gain "1.0". A signal processing circuit 26 subjects raw image data output from the CDS/AGC/AD circuit 24 to white balance adjustment, color separation, YUV conversion, etc., thereby generating YUV-format image data.

The generated image data is written by a memory control circuit 28 into an SDRAM 30, and read later by the same memory control circuit 28. A video encoder 32 converts the image data read by the memory control circuit 28 to a composite video signal in the NTSC format, and provides the converted composite video signal to the LCD monitor 34. Accordingly, a through image of the object scene is displayed on a monitor screen.

Y data forming the image data output from the signal processing circuit 26 is also provided to a luminance evaluation circuit 36. The luminance evaluation circuit 36 integrates the Y data belonging to a photometric area not illustrated, for a time period of one frame to calculate a luminance evaluation value. The CPU 44 executes an AE process for through image based on the thus calculated luminance evaluation value. More specifically, the CPU 44 fetches the luminance evaluation value from the luminance evaluation circuit 36 each time the vertical synchronization signal Vsync is generated, and adjusts the set amount of aperture and pre-exposure time to drivers 18 and 20, respectively, based on the fetched luminance evaluation value. This makes it possible to appropriately adjust the luminance of the through image displayed on the monitor screen.

If a shutter button 46 is half-pressed when a night scene mode, an auto mode or a sport mode is selected by a mode switch 48, the CPU 44 fetches the luminance evaluation value calculated by the luminance evaluation circuit 36 in response to the vertical synchronization signal Vsync, and calculates an optimum exposure time Ts based on the fetched luminance evaluation value. This calculation is carried out on the assumption that the aperture unit 14 is fully open and the AGC gain is "1.0".

Figure 2:
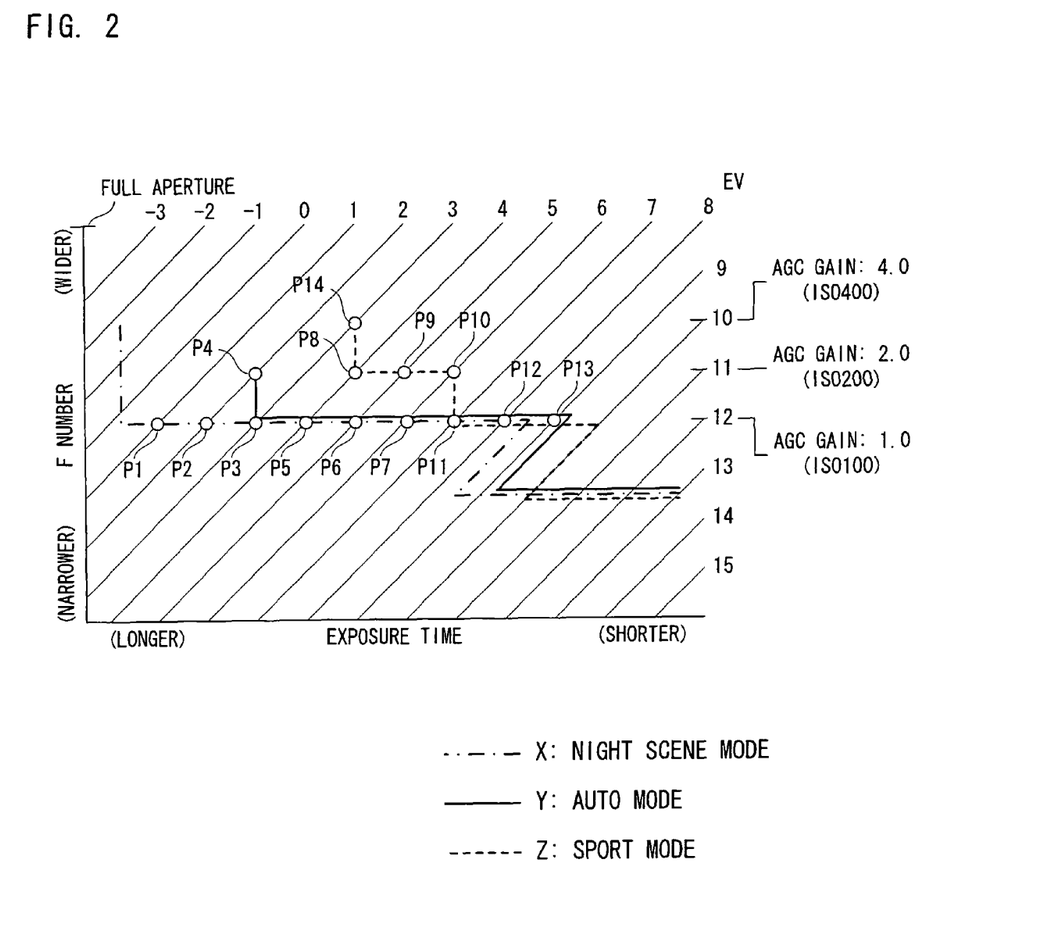
FIG. 2 is an illustrative view showing a plurality of program charts applied to the FIG. 1 embodiment.

The CPU 44 detects an EV value corresponding to the calculated optimum exposure time Ts and the fully-opened aperture amount, that is, an optimum EV value EVs, from an EV table shown in FIG. 2, and identifies an imaging parameter corresponding to the detected optimum EV value EVs, from a program chart X, Y or Z shown in FIG. 2. The program chart X is referred to if the night scene mode is selected, the program chart Y is referred to if the auto mode is selected, and the program chart Z is referred to if the sport mode is selected. The imaging parameter here is defined by amount of aperture, exposure time and AGC gain.

Besides, in any case of the program charts X, Y and Z, the AGC gain is changed while the amount of aperture is fixed in a longitudinal line section extending in a vertical direction, and the aperture amount is changed while the AGC gain is fixed in an oblique line section extending in an oblique direction.

These program charts X, Y and Z are stored in a flash memory 50. In addition, each of the program charts X, Y and Z is represented by M (M: 3 or a larger integer) imaging parameters.

When the shutter button 46 is fully pressed, the CPU 44 executes a photographing/recording process. The CPU 44 sets the amount of aperture and the exposure time defining the identified imaging parameter to the drivers 18 and 20, respectively, sets the AGC gain defining the identified imaging parameter to the CDS/AGC/AD circuit 24, and instructs the driver 20 to carry out primary exposure and reading of all pixels. The driver 18 controls the aperture unit 14 so as to obtain the set amount of aperture, and the driver 20 performs primary exposure according to the set exposure time and reads all pixels of a resulting raw image signal, one time each. Accordingly, a high-resolution raw image signal corresponding to the optical image of the object scene is output from the image sensor 16.

The gain of the output raw image signal is adjusted by the CDS/AGC/AD circuit 24. This gain adjustment is based on the set AGC gain. If the AGC gain is "2.0", the raw image signal is adjusted at a level amplified by twice. Also, if the AGC gain is "4.0", the raw image signal is adjusted at a level amplified by four times. The raw image data output from the CDS/AGC/AD circuit 24 is converted into YUV-format image data by the same process as described above, and the converted image data is written into the SDRAM 30 by the memory control circuit 28.

The CPU 44 also issues an image compression instruction to the JPEG codec 38. The JPEG codec 38 reads one frame of image data from the SDRAM 30 through the memory control circuit 28, subjects the read image data to JPEG compression, and then writes the compressed image data, i.e., the JPEG data into the SDRAM 30 through the memory control circuit 28. Further, the CPU 44 reads the JPEG data from the SDRAM 30 through the memory control circuit 28, and records an image file containing the read JPEG data, into the recording medium 42 through the I/F circuit 40. Upon completion of this photographing/recording process, the above mentioned through image processing is resumed.

If the shutter button 46 is half-pressed when a continuous shooting mode is selected by the mode switch 48, the CPU 44 fetches the luminance evaluation value calculated by the luminance evaluation circuit 36 in response to the vertical synchronization signal Vsync in the same manner as described above, and calculates the optimum exposure time Ts based on the fetched luminance evaluation value. This calculation is also performed on the assumption that the aperture unit 14 is full-open and the AGC gain is "1.0".

The CPU 44 subsequently detects the optimum EV value EVs corresponding to the calculated optimum exposure time Ts, the fully-opened aperture amount and the AGC gain "1.0", from the EV table shown in FIG. 2, and identifies the detected optimum EV value EVs. This allows the program chart X, Y or Z to be selected. More specifically, the program chart X is selected when the optimum EV value EVs is "2" or less, and the program chart Y is selected when the optimum EV value EVs is "3" or "4". Additionally, the program chart Z is selected when the optimum EV value EVs is "5", "6" or "7", and the program chart Y is selected when the optimum EV value EVs is "8" or more.

The CPU 44 then identifies three imaging parameters corresponding to "EVs−1", "EVs" and "EVs+1", respectively, from the selected program chart. Each of the imaging parameters is defined by amount of aperture, exposure time and AGC gain in the same manner as described above.

Therefore, if the optimum EV value EVs is "2", imaging parameters P1, P2 and P3 on the program chart X are identified. If the optimum EV value EVs is "3", imaging parameters P4, P3 and P5 on the program chart Y are identified. Further, if the optimum EV value is "4", imaging parameters P3, P5 and P6 on the program chart Y are identified.

Moreover, if the optimum EV value EVs is "5", imaging parameters P8, P9 and P10 on the program chart Z are identified. If the optimum EV value EVs is "6", imaging parameters P9, P10 and P11 on the program chart Z are identified. Furthermore, if the optimum EV value EVs is "7", imaging parameters P10, P11 and P12 on the program chart Z are identified. Also, if the optimum EV value EVs is "8", imaging parameters P11, P12 and P13 on the program chart Y are identified.

Here, a plurality of imaging parameters are assigned to each of the EV values "3", "4", "5" and "6". More specifically, the EV value "3" is given the imaging parameters P3 and P14, the EV value "4" is given the imaging parameters P5 and P8, the EV value "5" is given the imaging parameters P6 and P9, and the EV value "6" is given the imaging parameters P7 and P10.

Additionally, all the EV values "2", "3", "4", "5" and "6" may be "EVs−1". However, according to the above mentioned manners in which the program charts X, Y and Z are selected, the imaging parameter capable of being identified in correspondence with "EVs−1" is the imaging parameter P4 for the EV value "2", the imaging parameter P3 for the EV value "3", the imaging parameter P8 for the EV value "4", the imaging parameter P9 for the EV value "5", and the imaging parameter P10 for the EV value "6".

Here, the imaging parameter P3, not the imaging parameter P14, is selected for the EV value "3" because the AGC gain defining the imaging parameter P14 is as too high as "4.0" and thus selecting the imaging parameter P14 may cause unignorable noise on the entire image.

In addition, the imaging parameter P4, not the imaging parameter P2, is selected for the EV value "2", the imaging parameter P8, not the imaging parameter P5, is selected for the EV value "4", the imaging parameter P9, not the imaging parameter P6, is selected for the EV value "5", the imaging parameter P10, not the imaging parameter P7, is selected for the EV value "6" because the corresponding AGC gain "2.0" is a value with which noise occurring on the entire screen can be ignored and image distortion resulting from hand shaking can be reduced by selecting a shorter exposure time.

When the shutter button 46 is fully pressed, the CPU 44 executes an AE shift continuous shooting/recording process. The CPU 44 sets the amount of aperture, the exposure time and the AGC gain corresponding to "EVs−1" to the driver 18, the driver 20 and the CDS/AGC/AD circuit 24, respectively, in response to the first-time vertical synchronization signal Vsync. The CPU 44 sets the aperture amount, the exposure time and the AGC gain corresponding to "EVs" to the driver 18, the driver 20 and the CDS/AGC/AD circuit 24, respectively, in response to the second-time vertical synchronization signal Vsync. The CPU 44 sets the aperture amount, the exposure time and the AGC gain corresponding to "EVs+1" to the driver 18, the driver 20 and the CDS/AGC/AD circuit 24, respectively, in response to the third-time vertical synchronization signal Vsync. The CPU 44 also instructs the driver 20 to carry out primary exposure and reading of all pixels each time each of the setting operations is completed.

From then on, the same processes as described above are carried out. Consequently, three frames of image data different in luminance are recorded in a compressed state in the recording medium 42. Upon completion of this AE shift continuous shooting/recording process, the above mentioned through image processing is resumed.

Figure 3:
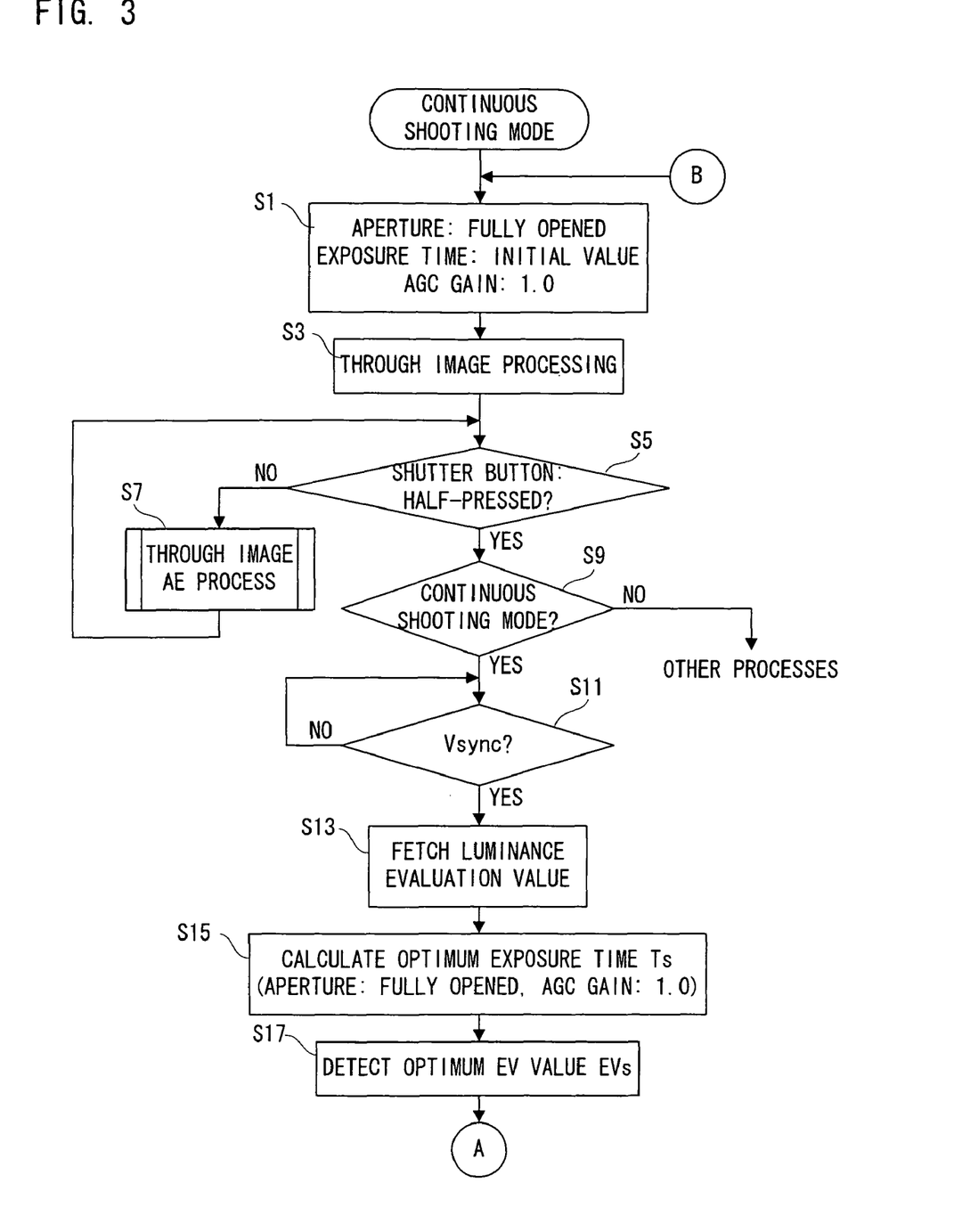
FIG. 3 is a flowchart showing a part of an operation of a CPU applied to the FIG. 1 embodiment.
Figure 4:
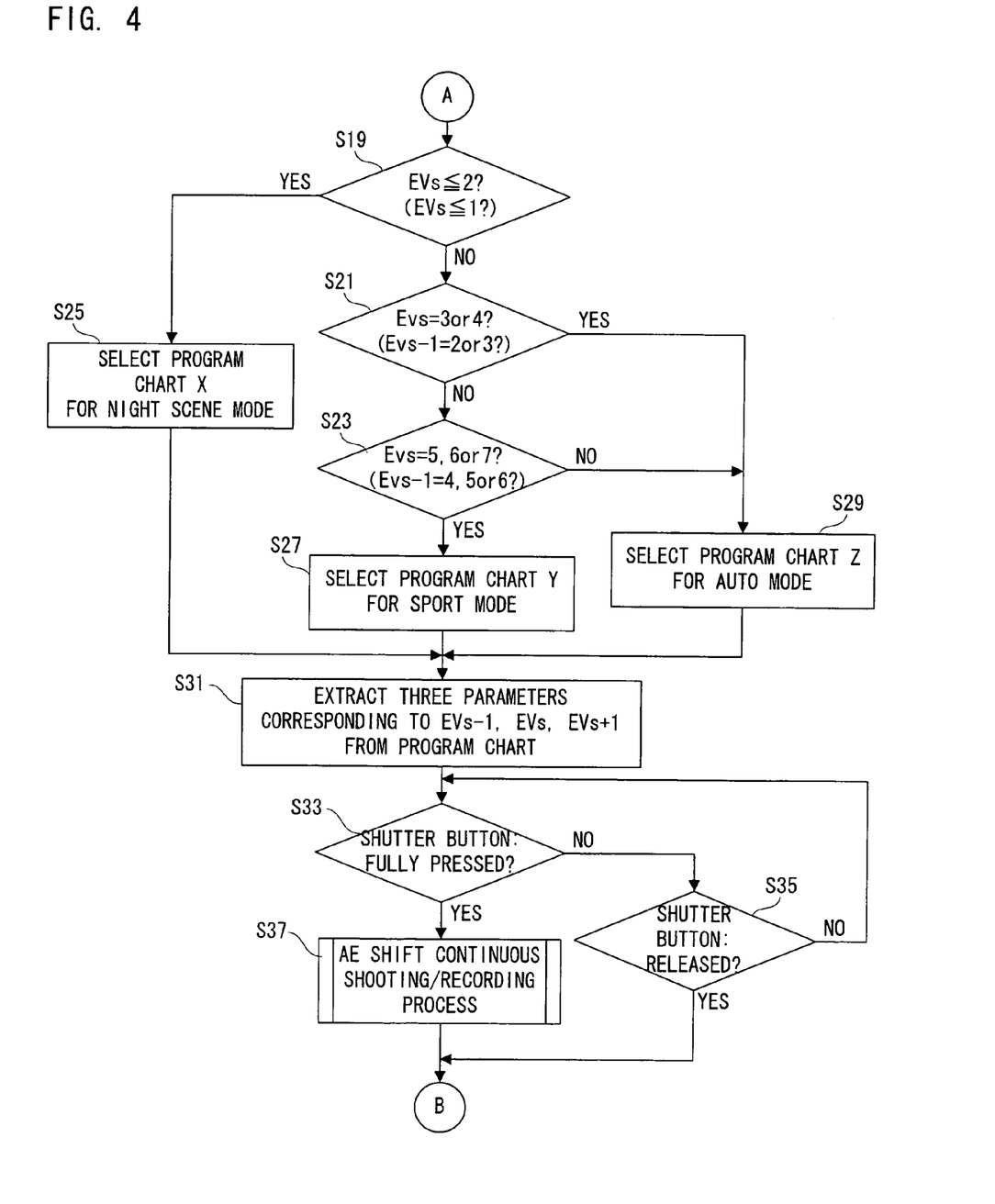
FIG. 4 is a flowchart showing another part of the operation of the CPU applied to the FIG. 1 embodiment.
Figure 5:
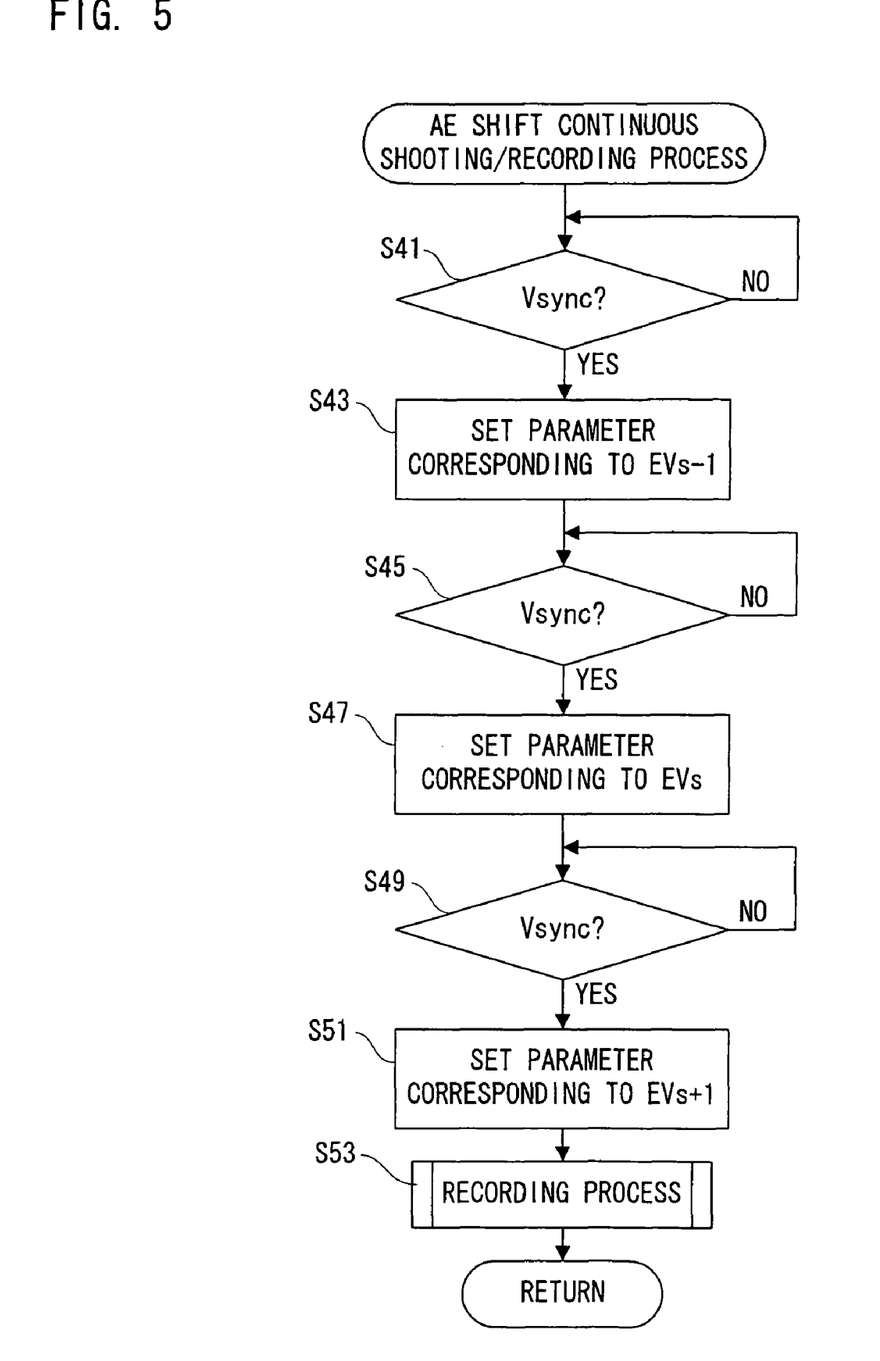
FIG. 5 is a flowchart showing still another part of the operation of the CPU applied to the FIG. 1 embodiment.

When the continuous shooting mode is selected, the CPU 44 executes the processes according to the flowchart shown in FIG. 3 to FIG. 5. The control program corresponding to the flowchart is stored in the flash memory 50.

In a step S1 shown in FIG. 3, the CPU 44 instructs the driver 18 to make the aperture fully-opened, instructs the driver 20 to set the exposure time at an initial value, and instructs the CDS/AGC/AD circuit 24 to set the AGC gain at "1.0". Upon completion of these settings, the CPU 44 executes through image processing in a step S3. Accordingly, a through image is output from the LCD monitor 34.

In a step S5, the CPU 44 determines whether the shutter button 46 is half-pressed or not. If NO here, the through image AE process of a step S7 is repeatedly carried out. This allows the luminance of the through image to be appropriately adjusted. If YES in the step S5, the CPU 44 determines the setting of the mode switch 48 in a step S9. The CPU 44 moves to the processes of step S11 and following ones if the continuous shooting mode is set, or moves to another process if the night scene mode, auto mode or sport mode is selected.

In the step S11, the CPU 44 determines whether the vertical synchronization signal Vsync has been generated or not, and if YES, the CPU 44 fetches a luminance evaluation value from the luminance evaluation circuit 36 in a step S13. In a step S15, the CPU 44 calculates the optimum exposure time Ts based on the fetched luminance evaluation value. This calculation is carried out on the assumption that the aperture unit 14 is fully open and the AGC gain is "1.0". In a step S17, the CPU 44 detects the EV value corresponding to the optimum exposure time Ts, the fully-opened aperture amount and the AGC gain "1.0", as the optimum EV value EVs. At this time, the detection is carried out with reference to the EV table shown in FIG. 2.

In a step S19, the CPU 44 determines whether the optimum EV value EVs is "2" or less. If YES here, the CPU 44 assumes that only the program chart X has the imaging parameter corresponding to "EVs−1", and selects the program chart X in a step S25. If the optimum EV value EVs is "3" or more, the CPU 44 proceeds to a step S21. At this moment, candidates for selection are narrowed to the program charts Y and Z. In the step S21, the CPU 44 determines whether or not the optimum EV value EVs is "3" or "4". If YES here, the CPU 44 selects the program chart Y in a step S29.

Consequently, the imaging parameter P14 on the program chart Z will not be selected corresponding to "EVs−1 (=3)", which makes it possible to avoid unignorable noise caused by the adoption of the AGC gain "4.0". Besides, the imaging parameter P4 on the program chart Y is selected corresponding to "EVs−1 (=2)" because the AGC gain "2.0" defining the imaging parameter P4 is a value with which noise can be ignored.

If NO in the step S21, the CPU 44 proceeds to a step S23 to determine whether or not the optimum EV value EVs is "5", "6" or "7". If YES here, the CPU 44 selects the program chart Z in a step S27 because the imaging parameter P8, P9 or P10 on the program chart Z corresponding to the EVs "4", "5" or "6" as "EVs−1" is defined by the AGC gain "2.0" with which noise can be ignored. If the optimum EV value is "8" or more, the CPU 44 selects the program chart Y in the step S29.

In a step S31, the CPU 44 extracts three parameters corresponding to "EVs−1", "EVs" and "EVs+1" from the selected program chart. Each of the three extracted parameters is defined by amount of aperture, exposure time and AGC gain. Upon completion of the extraction process, the CPU 44 determines in a step S33 whether the shutter button 46 is fully pressed or not, and determines in a step S35 whether the pressed shutter button 46 is released or not. If YES in the step S33, the CPU 44 performs the AE shift continuous shooting/ recording process in a step S37, and then returns to the step S1. If YES in the step S35, the CPU 44 returns directly to the step S1.

The AE shift continuous shooting/recording process of step S37 is carried out according to a subroutine shown in FIG. 5. When the first-time vertical synchronization signal Vsync has been produced, the CPU 44 moves from a step S41 to a step S43 to set the imaging parameter corresponding to "EVs−1" to the imaging device 25. The amount of aperture is set to the driver 18, the exposure time is set to the driver 20 and the AGC gain is set to the CDS/AGC/AD circuit 24. As a result, the image data having a luminance level lower than the optimum value is saved in the SDRAM 30.

Upon generation of the second-time vertical synchronization signal Vsync, the CPU 44 proceeds from a step S45 to a step S47 to set the imaging parameter corresponding to "EVs" to the imaging device 25. As described above, the amount of aperture is set to the driver 18, the exposure time is set to the driver 20, and the AGC gain is set to the CDS/AGC/ AD circuit 24. Consequently, the image data having an optimum luminance level is saved in the SDRAM 30.

Upon generation of the third-time vertical synchronization signal Vsync, the CPU 44 proceeds from a step S49 to a step S51 to set the imaging parameter corresponding to "EVs+1" to the imaging device 25. In this case as well, the amount of aperture is set to the driver 18, the exposure time is set to the driver 20, and the AGC gain is set to the CDS/AGC/AD circuit 24. Consequently, the image data having a luminance level higher than the optimum value is saved in the SDRAM 30.

In a step S53, the CPU 44 subjects these three frames of image data saved in the SDRAM 30 to a recording process. More specifically, the CPU 44 instructs the JPEG codec 38 to perform a compression process on the three frames, and records the obtained three frames of JPEG data into the recording medium 42 through the I/F circuit 40. Upon completion of the recording process, the CPU 44 returns to the higher-layer routine.

As understood from the above description, the imaging device 25 executes an exposing operation for exposing the object scene and an amplifying operation for amplifying a raw image signal generated by the exposing operation, according to the set imaging parameter. Each of the plurality of program charts X, Y and Z stored in the flash memory 50 is represented by M (M: 3 or a larger integer) imaging parameters.

The CPU 44 selects a single program chart that satisfies a parameter condition, from among the plurality program charts X, Y and Z held by the flash memory 50 (S19, S21, S23, S25, S27, S29). The CPU 44 extracts the N (N: 2 or an integer larger than 2 and less than M) imaging parameters from the selected program chart (S31). The CPU 44 sets the extracted N imaging parameters to the imaging device 25 (S43, S47, S51).

The imaging parameter here includes exposure time, amount of aperture and AGC gain as parameter elements. In addition, the parameter condition includes an AGC gain condition in that each of the N AGC gains defining respectively the N imaging parameters is equal to or less than the predetermined value (=2.0) and an exposure time condition in that the N exposure times defining respectively the N imaging parameters are shorter.

By focusing attention on the program chart in which each of the N AGC gains defining respectively the N imaging parameters is equal to or less than the predetermined value, it is possible to reduce noise superimposed on the entire image signal. Additionally, by taking notice of the program chart in which the N exposure times defining respectively the N imaging parameters are shorter, it is possible to prevent image distortion resulting from hand shaking. This implements successful bracket photography.

Besides, this embodiment uses the CCD-type image sensor, and may employ the CMOS-type image sensor instead.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
    an imager for carrying out an exposing operation for exposing an object scene and an amplifying operation for amplifying an image signal generated by said exposing operation, according to a set imaging parameter;
    a holder for holding a plurality of program charts each of which is represented by M imaging parameters wherein M is an integer equal to or larger than three;
    a detector for detecting an EV value corresponding to a calculated exposure time;
    a selector for selecting a single program chart which satisfies a parameter condition, from among the plurality of program charts held by said holder;
    an extractor for extracting N imaging parameters from the program chart selected by said selector, wherein N is an integer equal to or larger than two and smaller than M; and
    a setter for setting the N imaging parameters extracted by said extractor to said imager, wherein each of the imaging parameters includes an exposure time, an amount of aperture and an amplification factor as parameter elements,
    wherein the imager implements bracket photography including executing AE shift continuous shooting N times,
    wherein the parameter condition includes an amplification factor condition in that each of N amplification factors defining respectively the N imaging parameters is equal to or less than a predetermined value and an exposure time condition in that N exposure times defining respectively the N imaging parameters are shorter, and
    wherein the selector selects the single program chart based on the exposure time condition such that the N exposure times of the N imaging parameters corresponding to the detected EV value become shorter.

2. An electronic camera according to claim 1, further comprising a detector for detecting a parameter element coefficient with which an image based on an image signal output from said imager has proper luminance, wherein said selector selects a program chart corresponding to the parameter element coefficient detected by said detector.

3. An electronic camera according to claim 1, wherein said N imaging parameters include a proper imaging parameter with which an image based on an image signal output from said imager has proper luminance.

4. An electronic camera according to claim 1, wherein the predetermined value is decided in consideration of amount of noise appearing on the image based on the amplified image signal.

5. An electronic camera according to claim 1, further comprising a recording processor for subjecting to a recording process N image signals obtained by N exposing operations and N amplifying operations according to said N imaging parameters.

6. An electronic camera according to claim 1, wherein the plurality of program charts held by said holder correspond to a plurality of imaging modes, respectively.

7. An imaging control program product having a non-transitory computer readable medium having a computer program logic to be executed by a processor of an electronic camera comprising an imager for carrying out an exposing operation for exposing an object scene and an amplifying operation for amplifying an image signal generated by the exposing operation according to a set imaging parameter and a holder for holding a plurality of program charts each of which is represented by M imaging parameters, wherein M is an integer equal to or larger than three, wherein the computer program logic is executable by the processor to perform a method comprising:
    a detecting step of detecting an EV value corresponding to a calculated exposure time;
    a selecting step of selecting a single program chart which satisfies a parameter condition, from among the plurality of program charts held by said holder;
    an extracting step of extracting N imaging parameters from the program chart selected in said selecting step, wherein N is an integer equal to or larger than two and smaller than M; and
    a setting step of setting the N imaging parameters extracted in said extracting step to said imager, wherein each of the imaging parameters includes an exposure time, an amount of aperture and an amplification factor as parameter elements,
    wherein the imager implements bracket photography including executing AE shift continuous shooting N times,
    wherein the parameter condition includes an amplification factor condition in that each of N amplification factors defining respectively the N imaging parameters is equal to or less than a predetermined value and an exposure time condition in that N exposure times defining respectively the N imaging parameters are shorter, and
    wherein the selecting step selects the single program chart based on the exposure time condition such that the N exposure times of the N imaging parameters corresponding to the detected EV value become shorter.

8. An imaging control method to be practiced by an electronic camera comprising an imager for carrying out an exposing operation for exposing an object scene and an amplifying operation for amplifying an image signal generated by the exposing operation according to a set imaging parameter and a holder for holding a plurality of program charts each of which is represented by M imaging parameters, wherein M is an integer equal to or larger than three, comprising the steps of:
    (a) detecting an EV value corresponding to a calculated exposure time;
    (b) selecting a single program chart which satisfies a parameter condition, from among the plurality of program charts held by said holder;
    (c) extracting N imaging parameters from the program chart selected in said step (b), wherein N is an integer equal to or larger than two and smaller than M; and
    (d) setting the N imaging parameters extracted in said step (c) to said imager, wherein each of the imaging parameters includes an exposure time, an amount of aperture and an amplification factor as parameter elements,
    wherein the imager implements bracket photography including executing AE shift continuous shooting N times, wherein the parameter condition includes an amplification factor condition in that each of N amplification factors defining respectively the N imaging parameters is equal to or less than a predetermined value and an exposure time condition in that N exposure times defining respectively the N imaging parameters are shorter, and wherein the selecting step selects the single program chart based on the exposure time condition such that the N exposure times of the N imaging parameters corresponding to the detected EV value become shorter.

* * * * *